US009069333B1

(12) United States Patent
Romans

(10) Patent No.: US 9,069,333 B1
(45) Date of Patent: Jun. 30, 2015

(54) PERSONAL ALARM WATCH

(76) Inventor: Natascha Romans, Indianapolis, IN (US)

( * ) Notice: Subject to any disclaimer, the term of this patent is extended or adjusted under 35 U.S.C. 154(b) by 346 days.

(21) Appl. No.: 13/585,015

(22) Filed: Aug. 14, 2012

(51) Int. Cl.

| | |
|---|---|
| ***G04B 47/00*** | (2006.01) |
| ***G04C 21/00*** | (2006.01) |
| ***G08B 1/08*** | (2006.01) |
| ***H04M 11/04*** | (2006.01) |
| ***G04G 13/02*** | (2006.01) |

(52) U.S. Cl.
CPC .................................... *G04G 13/02* (2013.01)

(58) Field of Classification Search
USPC .......................... 368/10, 11, 12, 72–74, 250; 340/539.12; 455/404.1, 404.2
See application file for complete search history.

(56) References Cited

U.S. PATENT DOCUMENTS

| | | | | |
|---|---|---|---|---|
| 5,023,853 | A | 6/1991 | Kawata et al. | |
| 5,334,974 | A * | 8/1994 | Simms et al. | 340/990 |
| 5,627,548 | A | 5/1997 | Woo et al. | |
| 6,044,257 | A * | 3/2000 | Boling et al. | 455/404.2 |
| D437,790 | S | 2/2001 | Isley et al. | |
| 6,362,778 | B2 | 3/2002 | Neher | |
| 6,807,564 | B1 * | 10/2004 | Zellner et al. | 709/206 |
| 7,046,140 | B2 * | 5/2006 | Adamczyk et al. | 340/539.18 |
| 2002/0072348 | A1 * | 6/2002 | Wheeler et al. | 455/404 |
| 2003/0231551 | A1 | 12/2003 | Saylor et al. | |
| 2004/0121756 | A1 | 6/2004 | Griffin et al. | |
| 2005/0250440 | A1 | 11/2005 | Zhou et al. | |
| 2008/0030350 | A1 * | 2/2008 | Brenner | 340/574 |
| 2008/0101160 | A1 | 5/2008 | Besson | |
| 2008/0214142 | A1 * | 9/2008 | Morin et al. | 455/404.2 |
| 2008/0238768 | A1 | 10/2008 | Nosworthy | |
| 2009/0098898 | A1 * | 4/2009 | Patterson | 455/521 |
| 2009/0186596 | A1 * | 7/2009 | Kaltsukis | 455/404.2 |
| 2010/0117822 | A1 * | 5/2010 | Hyatt | 340/539.12 |
| 2010/0231379 | A1 * | 9/2010 | Hutzler et al. | 340/539.12 |
| 2010/0267361 | A1 * | 10/2010 | Sullivan | 455/404.2 |
| 2010/0311387 | A1 * | 12/2010 | Cameron et al. | 455/404.2 |
| 2011/0111728 | A1 * | 5/2011 | Ferguson et al. | 455/404.2 |
| 2012/0225633 | A1 * | 9/2012 | Nichols | 455/404.1 |
| 2012/0282884 | A1 * | 11/2012 | Sun | 455/404.2 |
| 2013/0271264 | A1 * | 10/2013 | Page et al. | 340/6.1 |
| 2014/0120863 | A1 * | 5/2014 | Ferguson et al. | 455/404.2 |

* cited by examiner

*Primary Examiner* — Vit W Miska
(74) *Attorney, Agent, or Firm* — Kyle A. Fletcher, Esq.

(57) ABSTRACT

The personal alarm watch is an improved athletic sports watch, which includes the traditional time related features of a wristwatch along with a plurality of personal alarm features integrated therein. The wristwatch includes a pulse sensor integrated into a bottom surface that is in dermal contact with the end user's wrist in order to detect pulse, and which relays said information to a processing means located inside of the wristwatch. The wristwatch also includes a location-based technology along with the ability to communicate with the local authorities upon depression of a panic button in order to provide an alarm thereto. A speaker being manifested with said watch nay provide an additional level of security by emitting an audible alarm. Upon transmission of said alarm to said local authorities, the wristwatch further transmits an electronic file containing biographical and/or medical information about the end user.

8 Claims, 4 Drawing Sheets

PERSONAL ALARM WATCH

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

A. Field of the Invention

The present in relates to the field of wrist worn watches; more specifically, a wrist watch that has personal alarm means integrated theron.

B. Discussion of the Prior Art

As will be discussed immediately below, no prior art discloses an athletic sports wristwatch that has timing features as well as local time displays provided thereon in conjunction with a pulse sensor integrated into a bottom surface that is in dermal contact with the end user's wrist in order to detect pulse; wherein the wrist watch farther provides for location based technologies integrated therein along with a panic button, which when depressed shall communicate a distress signal to the local authorities and working in conjunction with the location-based technology shall communicate the location of the wristwatch thereto; wherein the wristwatch may further include a speaker to emit an audible alarm from said wristwatch; wherein the wristwatch may be synched with another wristwatch in order to provide an alarm there between, and via a cell phone tower.

The Kawata et al. Patent (U.S. Pat. No. 5,023,853) discloses a wristwatch with a vibrating alarm. However, the wristwatch is incapable of detecting pulse, and providing location based alarm to a local authority in the event of depression of a panic button.

The Besson Parent Application Publication (U.S. Pub. No. 2008/0101160) discloses a wristwatch that can contact 911 emergency service and has a global positioning feature. However, the wristwatch is silent as to a panic button and pulse sensor.

The Woo et al. Patent (U.S. Pat. No. 5,627,548) discloses a wrist watch that has GPS. However, the wristwatch does not include a panic button or a pule sensor The Nosworthy Patent Application Publication (U.S. Pub. No. 2008/0238768) discloses a wristwatch having integrated GPS tracking, behavior monitoring, and panic alarm devices. However, the wristwatch is silent as to a panic button and pulse sensor.

The Griffin et al. Patent Application Publication (U.S. Pub. No. 2004/0121756) discloses an individual emergency tracking system for providing efficient notification to authorities and family that an individual is experiencing an emergency. However, the wristwatch is silent as to a panic button and pulse sensor.

The Neher Patent (U.S. Pat. No. 6,362,778) discloses a wrist-worn personal location system that utilizes GPS technology to track a user, which includes a panic button to transmit an emergency signal. However, the wristwatch is silent as to a pulse sensor.

The Saylor et al. Patent Application Publication (U.S. Pub. No. 2003/0231551) discloses a health indicating watch which is capable of measuring and displaying by digital readout the user's temperature, pulse, and blood pressure. However, the watch is not an athletic sports wristwatch directed to providing a personal alarm with the integration of a pulse sensor, panic button, and location based technology such as GPS.

The Zhou et al. Patent Application Publication (U.S. Pub. No. 2003/0250440) discloses a wristwatch device comprising a GPS receiver, wireless transceiver, bio-sensor, and ECG worn by a person and which transmits a GPS signal location to a specified service when vital signals indicate the need for emergency care. However, the watch is not an athletic sports wristwatch directed to providing a personal alarm with the integration of a pulse sensor, panic button, and location based technology such as GPS.

While the above-described devices fulfill their respective and particular objects and requirements, they do not describe an athletic sports wristwatch that has timing features as well as local time displays provided thereon in conjunction with a pulse sensor integrated into a bottom surface that is in dermal contact with the end user's wrist in order to detect pulse; wherein the wrist watch further provides for location based technologies integrated therein along with a panic button, which when depressed shall communicate a distress signal to the ideal authorities and working in conjunction with the location-based technology shall communicate the location of the wristwatch thereto; wherein the wristwatch may further include a speaker to emit an audible alarm from said wristwatch; wherein the wristwatch may be synched with another wristwatch in order to provide an alarm there between, and via a cell phone tower. In this regard, the personal alarm watch departs from the conventional concepts and designs of the prior art.

SUMMARY OF THE INVENTION

The personal alarm watch is an improved athletic sports watch, which includes the traditional time related features of a wristwatch along with a plurality of personal alarm features integrated therein. The wristwatch includes a pulse sensor integrated into a bottom surface that is in dermal contact with the end user's wrist in order to detect pulse, and which relays said information to a processing means located inside of the wristwatch. The wristwatch also includes a location-based technology along with the ability to communicate with the local authorities upon depression of a panic button in order to provide an alarm thereto. A speaker being manifested with said watch may provide an additional level of security by emitting an audible alarm. Upon transmission of sale alarm to said local authorities, the wristwatch further transmits an electronic file containing biographical and/or medical information about the end user.

An object of the invention is to provide a wristwatch that resembles and functions like a typical sports watch, and which provides the time and a timing or stopwatch capability.

Another object of the invention is to provide a wristwatch that detects the pulse of the end user, and which is communicable with a processing means that can emit an alarm to the local authorities.

A further object of the invention is to provide a location-based technology that couples with the processing means in order to communicate the location of the wristwatch upon transmission of said personal alarm.

A further object of the invention is to provide a panic button, which when depressed shall signal the local authorities.

An even further object of the invention is to provide a lock button, which works to lock the alarm when in use.

Another object of the invention is to transmit an electronic file to the local authorities, which transmits a plurality of biographical and/or medical information about the end user associated with the emitted alarm.

A further object of the invention is to enable multiple wristwatches to communicate with one another via a cell phone tower whereby one wristwatch can transmit an alarm to another wristwatch.

These together with additional objects, features and advantages of the personal alarm watch will he readily apparent to those of ordinary skill in the art upon reading the following detailed description of presently preferred, but nonetheless illustrative, embodiments of the personal alarm watch when taken in conjunction with the accompanying drawings.

In this respect, before explaining the current embodiments of the personal alarm watch in detail, it is to be understood that the personal alarm watch is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the personal alarm watch.

It is therefore important that the claims be regarded as including such equivalent construction insofar as they do not depart from the spirit and scope of the personal alarm watch. It is also to be understood that the phraseology and terminology employed herein are for purposes of description and should not be regarded as limiting.

BRIEF DESCRIPTION OF THE DRAWINGS

The accompanying drawings, which are included to provide a further understanding of the invention and are incorporated in an constitute a part of this specification, illustrate embodiments of the invention and together with the description serve to explain the principles of the invention.

In the drawings.

Figure 1:
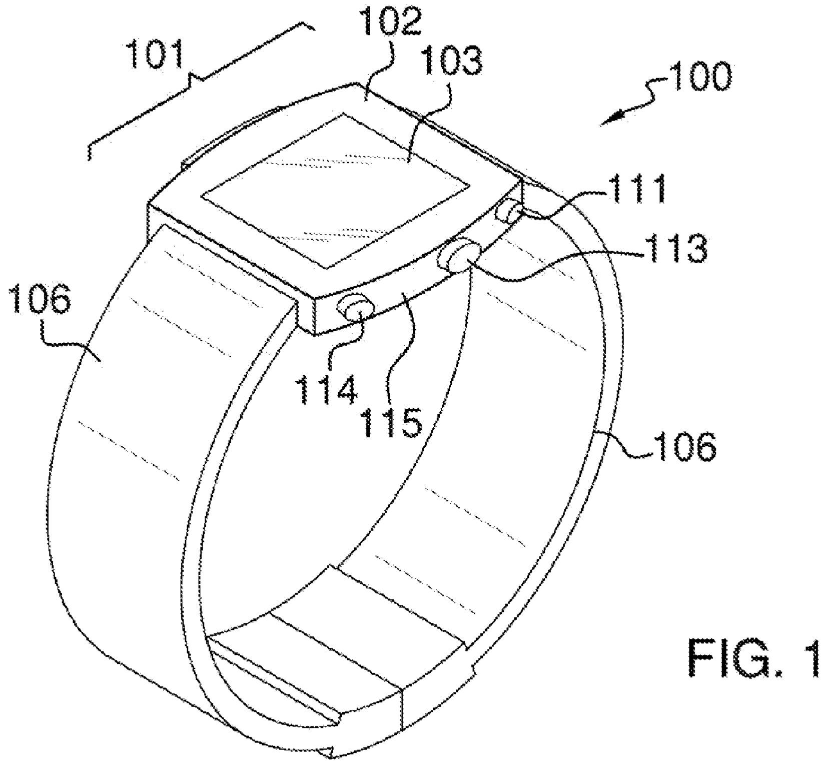
FIG. 1 illustrates a perspective view of the personal alarm watch.
Figure 2:
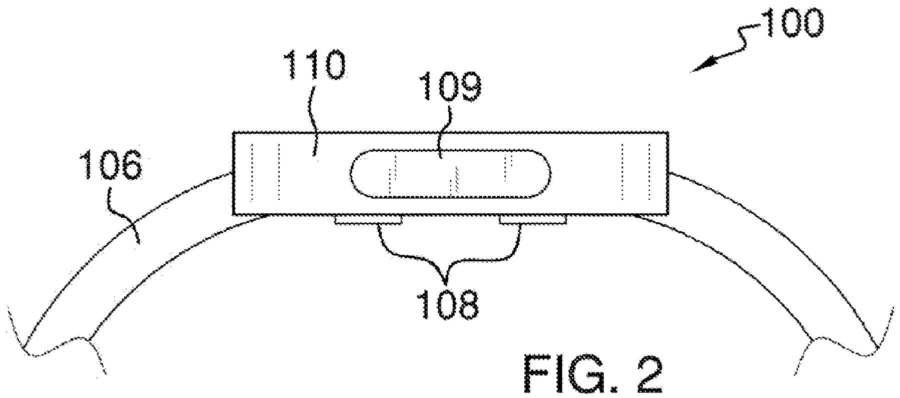
FIG. 2 illustrates a side view of the personal alarm watch.
Figure 3:
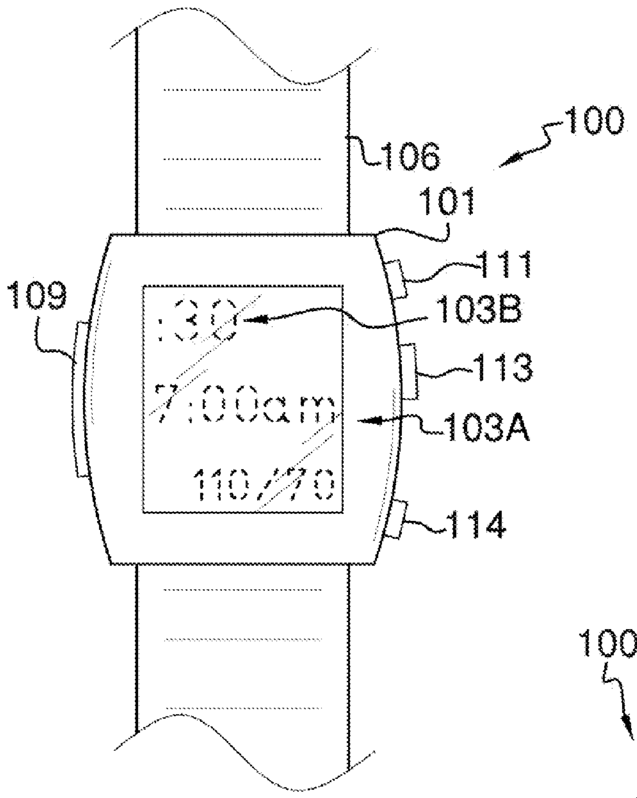
FIG. 3 illustrates a top view of the personal alarm watch.
Figure 4:
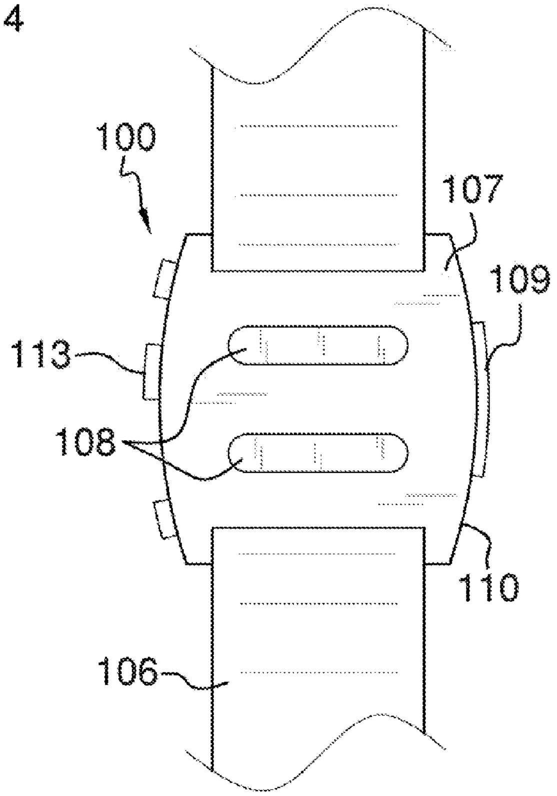
Figure 5:
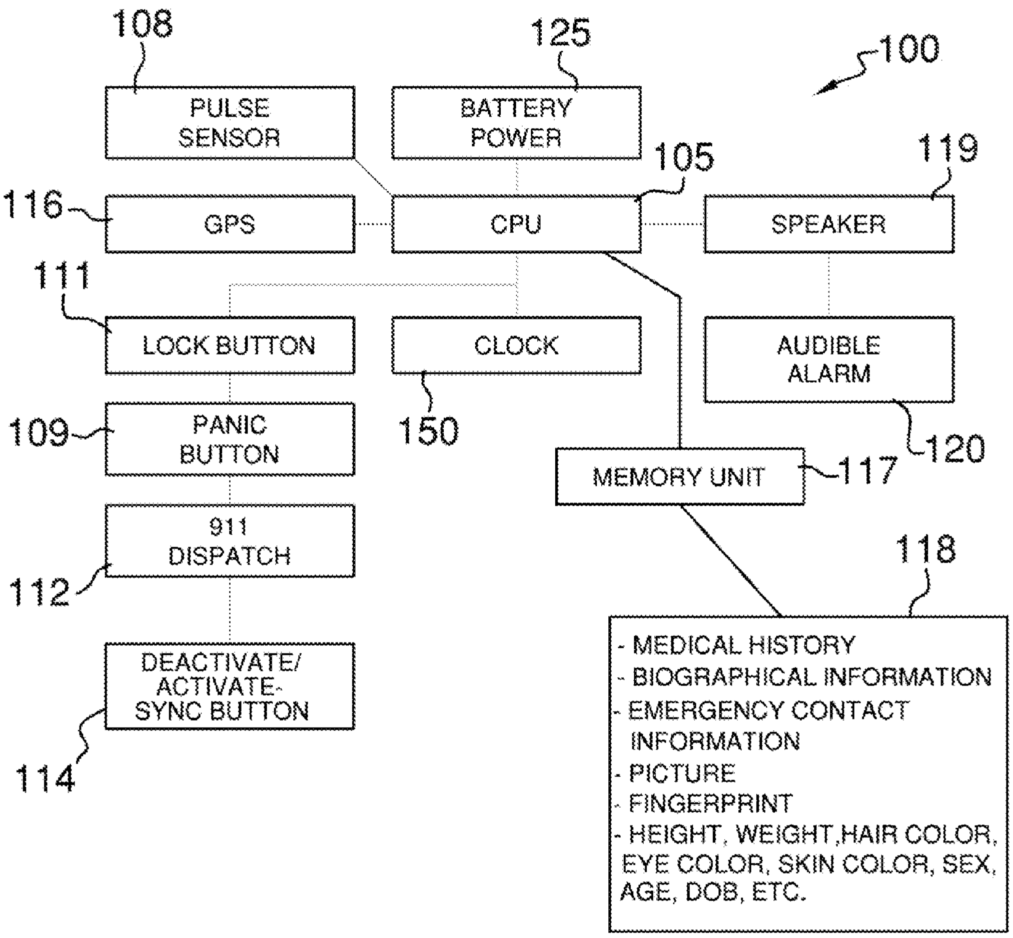
Figure 6:
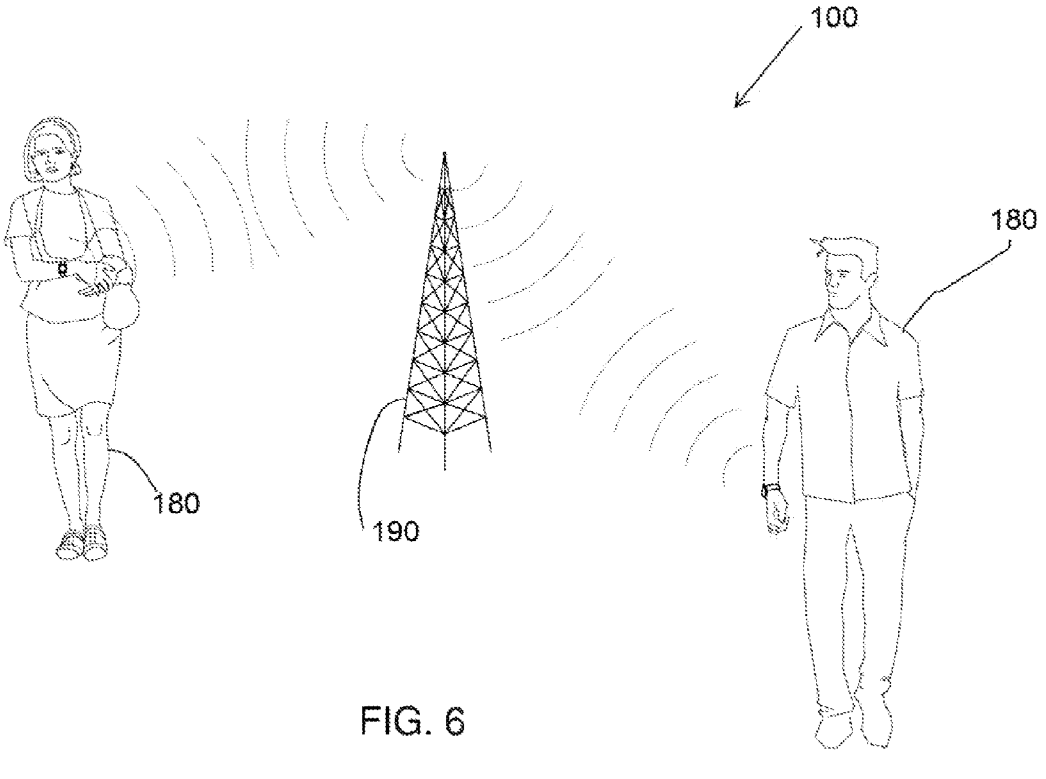

FIG, 4 illustrates a bottom view of the personal alarm watch;

FIG. 5 illustrates a block diagram of the various componentry associated with the use of the personal alarm watch; and FIG. 6 illustrates a view of at least two wristwatches that can communicate with one another via a cell phone tower.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to the preferred embodiment of the present invention, examples of which are illustrated in FIGS. 1-6. A personal alarm watch 100 (hereinafter invention) includes a housing 101 defined with a top surface 102 upon which a display 103 is provided, and which is in wired communication with a processing means 105. The display 103 is responsible for displaying certain information in the form of time of day 103A, a timing or stopwatch data 103B, and/or pulse data 103C. The time of day 103A and timing/stopwatch data 103B features is each controlled via a clock 150.

The processing means 105 is located inside of the housing 101, and is in the form of a central processing unit (hereinafter CPU). The CPU 105 is responsible for the overall functionality of the invention 100. The CPU 105 is wired to the clock 150, which affords the invention 100 the ability to tell time, and perform stopwatch or timing functions, which are displayed on the display 103. The housing 101 includes a wristband 106 from which the invention 100 is worn around the wrist of an end user, and in a manner consistent with any wristwatch. The housing 101 is further defined with a bottom surface 107 upon which a pulse sensor 108 is provided. The pulse sensor 108 is located on the bottom surface 107 such that the housing 101 enables the pulse sensor 108 to touch against the wrist of the end user when so worn. Moreover, the pulse sensor 103 may compute the pulse of the end user, which is then presented on the display 103 as the pulse data 103C.

The pulse sensor 108 is in wired communication with the CPU 105, and relays pulse information thereto, and is used in connection with the personal alarm functionality of the invention 100. The CPU 105 is wired to a panic button 109, which is located on a first side surface 110 of the housing 101.

Referring to FIG. 5, the CPU 105 is wired to a lock button 111, which is in turn wired to the panic button 109, which is in turn wired to a block designated as "911 dispatch" 112. The "911 dispatch" 112 is hereby being referred to as a cellular transceiver 112, which can communicate an alarm signal or distress signal via wireless telephone to the local 911 dispatch operator. The cellular transceiver 112 is only able to telephone a designated number such as "911", and which is adapted to different numbers that may have the same call function as is associated with different regions or countries throughout the world.

Referring to FIG. 6, the invention 100 may be adapted for use with multiple stopwatches that are collectively synched up with one another such that multiple individuals 180 may issue an alarm that communicates with all synched stopwatches. Moreover, the invention 100 relies on the use of the cellular transceiver to communicate through a cell phone tower 190, which is portrayed in FIG. 6.

It shall be noted that where multiple stopwatches are synched up together, and upon transmission of an alarm, the invention 100 may additionally communicate said alarm to the 911-dispatch operator. It shall be noted that the ability to inter-communicate with multiple stopwatches, an additional setting may be programmed that either automatically calls the 911-dispatch operator or alternatively does not automatically call the 911-dispatch operator.

The CPU 105 is wired to a time set button 113 and deactivate button 114, which are collectively provided on one of the many surfaces of the housing 101. It shall be noted that the time set button 113 and the deactivate button 114 are located on the same surface of the housing 101, and are depicted on a second side surface 115. The deactivate button 114 is included in order to recall or retract an alarm when erroneously set.

The CPU 105 is further wired to a location based technology, which is in the form of a global positioning system 116 (hereinafter GPS unit). The GPS unit 116 is located inside of the housing 101, and transmits location based data as to the location of the invention 100 through the CPU 105, and to the cellular transceiver 122.

The CPU 105 is further wired to a memory unit 117, which is able to store certain information thereon, and which is transmitted as an electronic file to the "911" dispatch operator via the cellular transceiver 112. The memory unit 117 is important in that an electronic file 118 is stored thereon, and is transmitted in an emergency distress call or alarm function will inform the 911 dispatch operator as to any biographical and/or medical information, and be coupled to the location of the invention 100 via the GPS unit 116.

The electronic file 118 may include such information as the name, age, medical history, address, a picture of the end user, fingerprints, height, weight, hair color, eye color, skin color, sex, emergency contact information. Moreover, the electronic file 118 may be in the form of a .pdf file format, or .doc file format, or any other computer file format.

The housing 101 includes a speaker 119, which is wired to the CPU 105, and which emits an audible alarm 120 when the panic button 109 is so depressed. The speaker 119 alerts other people in the vicinity of the invention 100 as to the presence of the invention 100, and that an alarm is being transmitted to the local "911 dispatch" operator via the cellular transceiver 112.

The housing 101 and the CPU 105 are further wired to a powering means 125, which is responsible for providing electrical power to the various components of the invention 100. Referring to FIG. 5, the powering means 125 is depicted as "battery Power," which implies the use of at least one battery in order to supply electrical power, and is customary of a wristwatch.

With respect to the above description, it is to be realized that the optimum dimensional relationship for the various components of the invention 100, to include variations in size, materials, shape, form, function, and the manner of operation, assembly and use, are deemed readily apparent and obvious to one skilled in the art, and all equivalent relationships to those illustrated in the drawings and described in the specification are intended to be encompassed by the invention 100.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The invention claimed is:

1. A personal alarm watch comprising:

a CPU in wired communication with a display, a pulse sensor, a GPS unit, a cellular transceiver, a memory unit stored with an electronic file detailing medical and biographical information, a panic button, a powering means;

wherein upon depression of the panic button, the CPU signals an alarm to a local 911 dispatch operator via the cellular transceiver, and which communicates said electronic file as well as to the location of the personal alarm watch via the GPS unit;

wherein the CPU is also in wired communication with a speaker that emits an audible alarm simultaneous with the alarm transmitted via the cellular transceiver;

wherein a housing is defined with a top surface upon which said display is provided; wherein the display is responsible for displaying certain information in the form of time of day, a timing or stopwatch data, and/or pulse data; wherein said certain information is controlled via a clock that is in wired communication with said CPU;

wherein the housing is further defined with a bottom surface upon which said pulse sensor is provided; wherein the pulse sensor is located on the bottom surface such that the housing enables the pulse sensor to touch against the wrist of the end user when so worn; wherein the pulse sensor may compute the pulse of the end user, which is then presented on the display as pulse data.

2. The personal alarm watch as described in claim 1 wherein the CPU is wired to said panic button, which is located on a first side surface of the housing.

3. The personal alarm watch as described in claim 2 wherein the CPU is wired to a lock button, which is in turn wired to the panic button, which is in turn wired to the cellular transceiver; wherein the cellular transceiver is only able to telephone a designated number such as "911",and which is adapted to different numbers that may have the same call function as is associated with different regions or countries throughout the world.

4. The personal alarm watch as described in claim 3 wherein the CPU is wired to a time set button and deactivate button, which are collectively provided on a second side surface of the housing; wherein the deactivate button is included in order to recall or retract an alarm when erroneously set.

5. The personal alarm watch as described in claim 4 wherein the CPU is wired to at least one battery in order to power the personal alarm watch.

6. The personal alarm watch as described in claim 1 wherein the electronic file includes such information as the name, age, medical history, address, a picture of the end user, fingerprints, height, weight, hair color, eye color, skin color, sex, and emergency contact information.

7. The personal alarm watch as described in claim 1 wherein the personal alarm watch is synched up with at least one more personal alarm watch such that alarms a communicated to one another via a cell phone tower.

8. A personal alarm watch comprising:

a CPU in wired communication with a display, a pulse sensor, a GPS unit, a cellular transceiver, a memory unit stored with an electronic file detailing medical and biographical information, a panic button, a powering means;

wherein upon depression of the panic button, the CPU signals an alarm to a local 911 dispatch operator via the cellular transceiver, and which communicates said electronic file as well as to the location of the personal alarm watch via the GPS unit;

wherein the CPU is also in wired communication with a speaker that emits an audible alarm simultaneous with the alarm transmitted via the cellular transceiver;

wherein a housing is defined with a top surface upon which said display is provided; wherein the display is responsible for displaying certain information in the form of time of day, a timing or stopwatch data, and/or pulse data; wherein said certain information is controlled via a clock that is in wired communication with said CPU;

wherein the electronic file includes such information as the name, age, medical history, address, a picture of the end user, fingerprints, height, weight, hair color, eye color, skin color, sex, and emergency contact information;

wherein the personal alarm watch is synched up with at least one more personal alarm watch such that alarms a communicated to one another via a cell phone tower.

* * * * *